United States Patent [19]

Jung

[11] Patent Number: 5,742,342
[45] Date of Patent: Apr. 21, 1998

[54] APPARATUS FOR ENCODING AN IMAGE SIGNAL USING VECTOR QUANTIZATION TECHNIQUE

[75] Inventor: Hae-Mook Jung, Seoul, Rep. of Korea

[73] Assignee: Daewoo Electronics, Co., Ltd., Seoul, Rep. of Korea

[21] Appl. No.: 622,233

[22] Filed: Mar. 27, 1996

[30] Foreign Application Priority Data

Mar. 28, 1995 [KR] Rep. of Korea .................. 95-6613

[51] Int. Cl.⁶ .................................................. H04N 7/30
[52] U.S. Cl. .................................... 348/405; 348/422
[58] Field of Search .................................... 348/400, 403, 348/404, 405, 407, 414, 417, 418, 422; 382/244, 245, 246, 248, 250, 253

[56] References Cited

U.S. PATENT DOCUMENTS 5,109,451  4/1992  Aono et al. ............................ 382/248
5,295,203  3/1994  Krause et al. .......................... 382/253
5,598,484  1/1997  Suzuki et al. .......................... 382/248

Primary Examiner—Amelia Au
Attorney, Agent, or Firm—Anderson, Kill & Olick, P.C.

[57] ABSTRACT

A digital video signal encoder includes a discrete cosine transform and quantization circuit for generating a set of quantized transform coefficients corresponding to each of the coding blocks. The set of quantized transform coefficients is divided into a first and a second subsets of scanned quantized transform coefficients by a scanning circuit, the first subset including a predetermined number of quantized transform coefficients located on a predetermined low frequency zone and the second subset having the rest of quantized transform coefficients located on a high frequency zone. The first and the second set are transferred to a vector quantizer and a variable length coder, respectively. The variable length coder performs the statistical coding of the second subset of quantized transform coefficients to thereby generate statistically coded data; and vector quantizer performs the vector quantization of the first subset of scanned quantized transform coefficients to thereby generate vector quantized data.

2 Claims, 2 Drawing Sheets

APPARATUS FOR ENCODING AN IMAGE SIGNAL USING VECTOR QUANTIZATION TECHNIQUE

FIELD OF THE INVENTION

The present invention relates to an image signal encoding apparatus; and, more particularly, to an apparatus employing the vector quantization technique which effectively reduce an amount of coded image data to be transmitted.

DESCRIPTION OF THE PRIOR ART

Transmission of digitized video signals can deliver video images of a much higher quality than the transmission of analog signals. When an image signal comprising a sequence of image "frames" is expressed in a digital form, a substantial amount of data is generated for transmission, especially in the case of high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

In the conventional hybrid coding technique, a block of a digital video signal is compressed by employing two-dimensional transform technique, and quantization of transform coefficients.

The block of the digital video signal may be either one of an interblock and an intrablock, wherein the interblock represents a block of motion compensated DPCM (differential pulse code modulation) as well known in the art and the intra block denotes a block of pixel data for a current frame of the digital video signal.

The two-dimensional transform technique, e.g., DCT, which reduces or removes spatial redundancies between image data within the intrablock or the interblock, converts a block of digital image data, for example, a block of 8x8 pixels, into a set of transform coefficient data. By processing such transform coefficient data with a quantizer, zig-zag scanning, a run-length coding (RLC) and a variable length coding (VLC), the amount of data to be transmitted can be effectively compressed.

Specifically, the block of transform coefficient data is quantized and then zig-zag scanned, thereby generating a stream of encoded image data composed of a plurality of zero and non-zero values. Thereafter, the data stream is subjected to a runlength coding to exploit runs of zeros therein.

A conventional apparatus employing the RLC converts the data stream into a multiplicity of runlength and a corresponding level, wherein the runlength represents the number of zeros in a run of continuous zeros preceding a non-zero value and the level indicates the magnitude of the non-zero value following the run of continuous zeros.

Generally, the stream of run-level pairs is further processed by the VLC technique. The VLC technique employs a VLC table wherein one variable length codeword from the VLC table is assigned to one run-level pair resulting from the RLC. In the VLC technique, since a shorter variable length codeword is assigned to a run-level pair which statistically occurs more frequently, the average word length of the variable length codeword becomes shorter than that of the source digital code, i.e., run-level pairs.

Since, however, non-zero valued quantized DCT coefficients are mainly located within the low frequency zone entailing a significant amount of run-length pairs to be coded, it is difficult to reduce the variable length codewords by employing a conventional variable length coding technique which typically has a VLC table based on the entire statistics of the source digital codes.

SUMMARY OF THE INVENTION

It is, therefore, an object of the invention to provide an image coding apparatus which is capable of providing an efficient bit rate reduction by employing a vector quantizer and a VLC coder depending on a local statistics of a video signal.

In accordance with the invention, there is provided a digital video signal encoder for coding a digital video signal, wherein said digital video signal is represented by a series of video frames, each video frame being divided into a plurality of coding blocks, the digital video signal encoder comprising: source coding means for generating a set of quantized transform coefficients corresponding to each of the coding blocks; scanning means for scanning the set of quantized transform coefficients by using a zig-zag scan method to produce a first and a second subsets of scanned quantized transform coefficients, the first subset including a plurality of quantized transform coefficients located on a predetermined low frequency region and the second subset having the rest of quantized transform coefficients; statistical coding means for statistically coding the second subset of quantized transform coefficients to thereby generate statistically coded data; and vector quantization coding means for vector quantizing the first subset of scanned quantized transform coefficients to thereby generate vector quantized data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
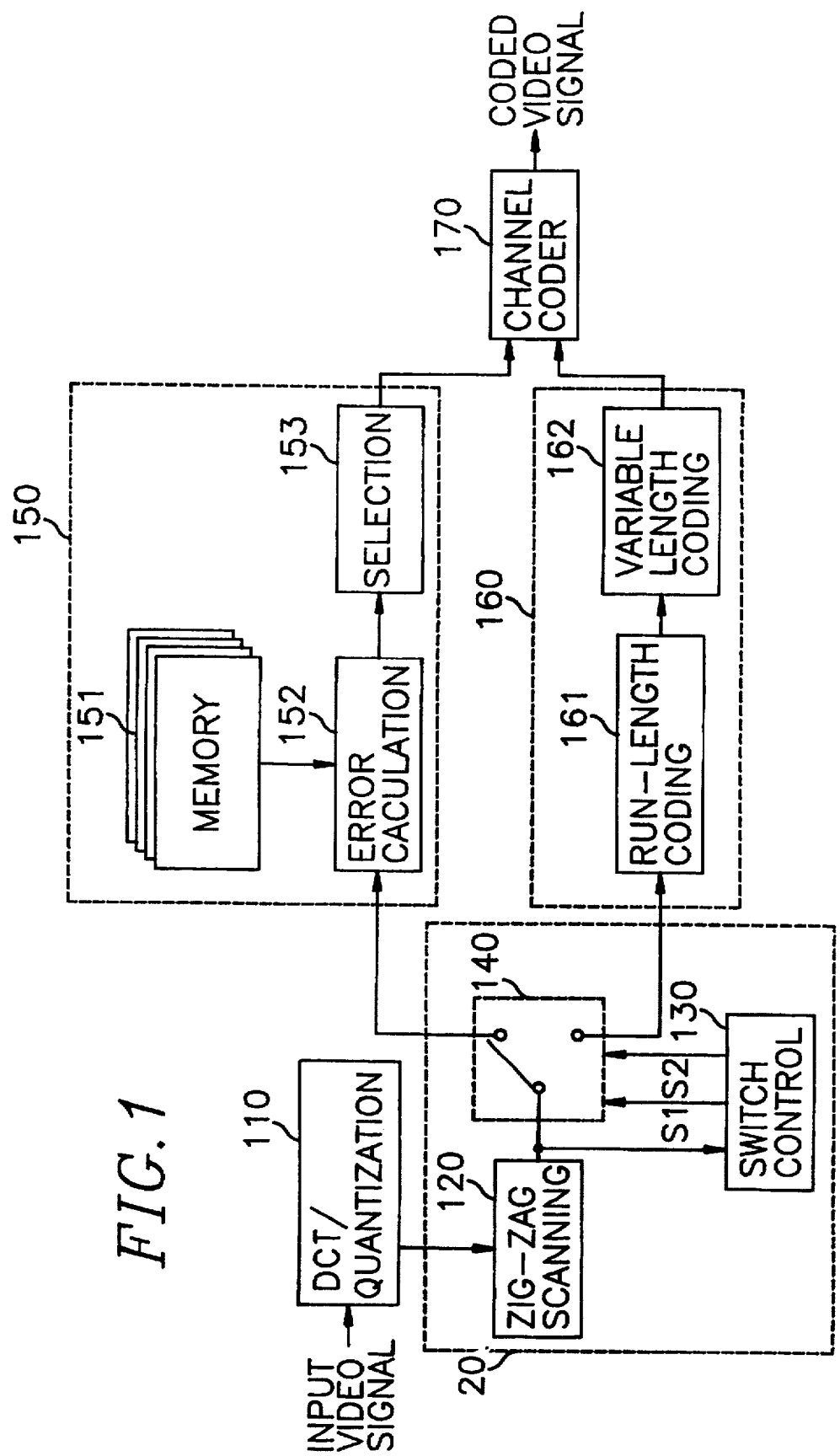
FIG. 1 is a block diagram of an image signal encoding system employing a vector quantizer in accordance with the present invention.

Referring to FIG. 1, there is shown a block diagram of an improved image signal encoding apparatus 10 having a vector quantizer in accordance with the present invention.

The encoding apparatus 10 comprises a DCT(discrete cosine transform) and quantization circuit 110, a scanning circuit 20, a vector quantizer 150, and a statistical coder 160.

An input digital video signal is applied to the DCT and quantization circuit 110, wherein the input digital video signal includes a plurality of video frames having, e.g., a current video frame and a previous video frame. The video frame signal is processed on a block-by-block basis, wherein the block of the video frame signal may be either an intra block or an inter block as described above and the block size of the video frame typically ranges between 8x8 and 32x32 pixels. As is known in the art, the DCT and quantization circuit 110 includes a Discrete Cosine Transform(DCT) circuit(not shown) and a quantization circuit(not shown).

Figure 2:
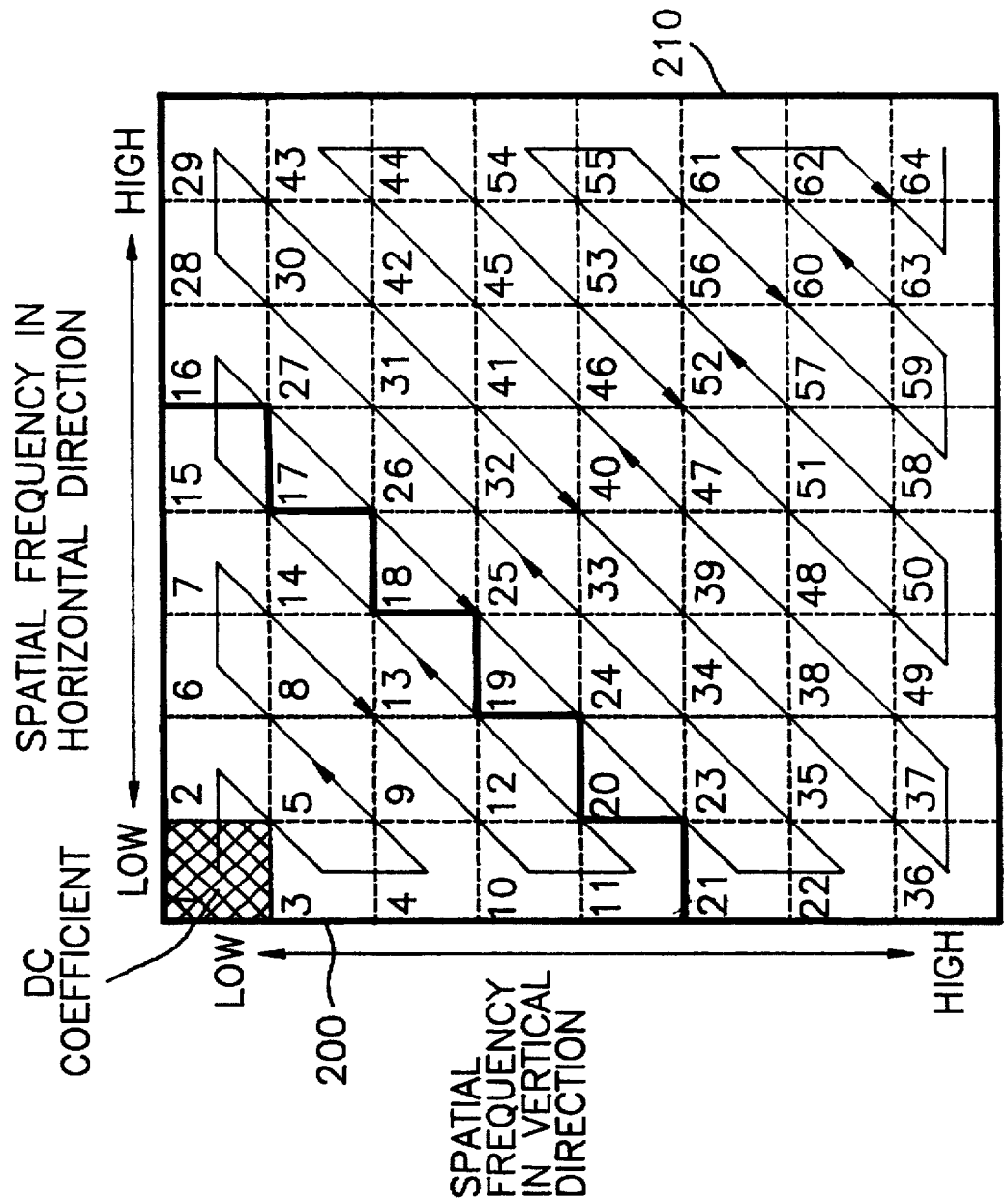
FIG. 2 is an exemplary diagram illustrating a quantized transform coefficient block.

At the DCT and quantization circuit 110, each of the input digital video signal is converted into a set of, e.g., DCT coefficients by using such a conventional transform technique as DCT, wherein, as is well known in the art, non-zero or significant DCT coefficients mainly appear in a low frequency zone which includes a DC coefficient, and zero or insignificant DCT coefficients are concentrated in a high frequency zone. The DCT coefficients in the block are then quantized into a set of quantized DCT coefficients through the use of any known quantization method at the DCT and quantization circuit 110. As well known in the art, insignificant DCT coefficients concentrated in the high frequency zone are converted into zero-valued quantized DCT coefficients by the quantization. Therefore, non-zero valued quantized DCT coefficients are located within the low frequency zone at the left-top corner of the block as shown in FIG. 2, while most of the zero valued coefficients are located in the high frequency zone.

The DCT and quantization circuit 110 outputs the set of quantized DCT coefficients to be provided to the scanning circuit 20. The scanning circuit 20 includes a zig-zag scanning block 120, a switch control block 130 and a switch 140; and serves to carry out the zig-zag scanning in order to generate a first subset of quantized DCT coefficients and a second subset of quantized DCT coefficients. The zig-zag scanning 120 scans the set of quantized DCT coefficients along a predetermined, e.g., zig-zag, scanning path progressively from low frequency quantized DCT coefficients toward high frequency quantized DCT coefficients as shown in FIG. 2, wherein the scanning sequence is represented by numeral at corresponding positions of the quantized DCT coefficients. Specifically, in the zig-zag scanning block 120, the quantized DCT coefficients are scanned along a zig-zag scanning path starting from a DC component located at the top-left corner of the block as shown in FIG. 2.

The scanned quantized DCT coefficients are then coupled to the switch control block 130 and the switch 140. The switch control block 130 counts the number of the scanned quantized DCT coefficients from the zig-zag scanning block 120 and provides a first control signal S1 to the switch 140 if a count number is equal to or less than a predetermined number M, e.g., 15, which represents an end of a predetermined low frequency zone in the set of the quantized DCT coefficients, M being an positive integer larger than 1 but smaller than 64. When the count number is larger than the predetermined number, the switch control block 130 generates a second control signal S2 to the switch 140.

In response to each of the first and the second control signals S1 and S2, the switch 140 provides the scanned quantized DCT coefficients to each of the vector quantizer 150 and the statistical coder 160. In other words, the first subset 200 having the first scanned quantized DCT coefficients is provided to the vector quantizer 150 and the second set 210 including the remaining coefficients in the high frequency zone is transferred to the variable length coder 160.

The vector quantizer 150 includes a memory 151, an error calculation block 152 and a selection block 153. The memory 151 stores a code book having a predetermined number N, e.g., 1024 of vector patterns, N being a positive integer lager than 1; and a corresponding set of indices. The set of the vector patterns is selected by using experimentally obtained statistics of source digital codes. Each of the vector patterns includes the predetermined number M of vector elements, e.g., M, corresponding to that of quantized DCT coefficients contained in the first subset. The error calculation block 151 receives the first subset of quantized DCT coefficients, the set of vector pattern and the corresponding set of indices; and compares the first subset to each of the vector patterns to generate a set of means squared errors (MSE's). Each of the means squared error is obtained as follows:

$$MSEi = \frac{1}{M} \Sigma |C(n) - Ai(n)|^2$$

wherein i=1,2,3 ... ,N; n=1,2,3 ... ,M; N and M are positive integers larger than 1; C(n) is a quantized DCT coefficient contained in the first subset; and Ai(n) is a corresponding element contained in an ith vector pattern.

The set of MSE and the corresponding set of indices are relayed to the selection block 153 which serves to select one index entailing a minimum MSE. The selected index is then transferred to a channel coder 170.

The statistical 160 including a run length coding block 161 and a variable length coding block 162 and receives the second set of quantized DCT coefficients from the switch 140. The run length coding block 161 sequentially converts the second set of quantized DCT coefficients into run-level pairs, each run-level pair representing a run-length and a corresponding level, wherein the run-length represents the number of zeros in a run of continuous zeros preceding a non-zero value and the level indicates the magnitude of the non-zero value following the run of continuous zeros. The run-level pairs from the run length coding block 161 are provided to the variable length coding block 162 which converts run-level pairs corresponding to the high frequency zone into variable length codewords in such a manner that a shorter variable length codeword is assigned to a run level pair which statistically occurs more frequently.

Thereafter, the variable length codewords from the variable length coding block 162 are provided to the channel coder 170 which combines the selected index and the variable length codewords and transmits the combined index and codewords as a coded video signal.

As may be seen from the above, the encoder of the present invention includes a vector quantizer for encoding the first set of quantized DCT coefficients located on the predetermined low frequency zone, wherein the first set entails more run-length pairs than that of the second set of quantized DCT coefficients located on the high frequency zone. It is, therefore, readily appreciated that the encoder of the present invention is capable of providing an effective reduction of an amount of coded image data to be transmitted.

While the present invention has been described with respect to the particular embodiments, it will be apparent to those skilled in the art that various changes and modifications may be made without departing from the scope of the invention as defined in the following claims.

What is claimed is:

1. A digital video signal encoder for coding a digital video signal, wherein said digital video signal is represented by a series of video frames, each video frame being divided into a plurality of coding blocks, comprising:

a source coder for generating a set of quantized transform coefficients corresponding to each of the coding blocks;

a scanner for scanning the set of quantized transform coefficients to generate a first subset of scanned quantized transform coefficients having a predetermined number of quantized transform coefficients located on a predetermined low frequency zone and a second subset of scanned quantized transform coefficients having the rest of quantized transform coefficients, wherein said scanning means includes:

a zig-zag scanner for scanning the set of quantized transform coefficients in accordance with a zig-zag scanning path to sequentially generate scanned quantized transform coefficients;

a counter for counting the scanned quantized transform coefficients to generate a first control signal if a count number is equal to or less than the predetermined number and a second control signal if the count number is larger than the predetermined number;

a switch for providing the scanned quantized transform coefficients as the first subset and the second subset in response to the first control signal and the second control signal, respectively;

a statistical coder for statistically coding the second subset of quantized transform coefficients to generate statistically coded data; and a vector quantization coder for vector quantizing the first subset of scanned quantized transform coefficients to generate vector quantized data, wherein the vector quantization coder includes:

a storage device for storing a plurality of vector patterns, each of the vector patterns having a predetermined number of vector elements and a plurality of indices corresponding to each of the vector patterns;

an error calculator for calculating a mean squared error between the first subset of scanned quantized transform coefficients and each of the vector patterns; and a selector for selecting an index as the vector quantized data, said index representing a vector pattern corresponding to a minimum squared error.

2. The digital video signal encoder as recited in claim 1, wherein the statistical coder includes a run-length coder for converting the second set of scanned quantized transform coefficients into a number of run-level pairs; and a variable length coder for coding each of the run-level pairs to generate a multiplicity of variable length codewords as the statistically coded data.

* * * * *